US012150576B2

(12) United States Patent
Riepe et al.

(10) Patent No.: US 12,150,576 B2
(45) Date of Patent: Nov. 26, 2024

(54) LOCKOUT BOX

(71) Applicant: ABUS August Bremicker Söhne KG, Wetter-Volmarstein (DE)

(72) Inventors: Bettina Riepe, Wuppertal (DE); Tobias Weiß, Schwerte (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 1121 days.

(21) Appl. No.: 17/008,701

(22) Filed: Sep. 1, 2020

(65) Prior Publication Data

US 2021/0068574 A1 Mar. 11, 2021

(30) Foreign Application Priority Data

Sep. 6, 2019 (DE) ......................... 102019123959.1

(51) Int. Cl.
*A47G 29/10* (2006.01)
*E05G 1/00* (2006.01)
*E05G 1/026* (2006.01)

(52) U.S. Cl.
CPC ............. *A47G 29/10* (2013.01); *E05G 1/005* (2013.01); *E05G 1/026* (2013.01)

(58) Field of Classification Search
CPC .......... E05G 1/005; E05G 1/026; A47G 29/10
USPC .......................................................... 312/326
See application file for complete search history.

(56) References Cited

U.S. PATENT DOCUMENTS

| | | | | | |
|---|---|---|---|---|---|
| 1,161,955 | A | * | 11/1915 | Nicholas | A47F 5/0823 211/59.1 |
| 2,068,083 | A | * | 1/1937 | Souter | G09F 1/12 40/651 |
| 3,293,779 | A | * | 12/1966 | Vogeli, Sr. | B60R 7/04 40/643 |
| 3,973,813 | A | * | 8/1976 | Nesmith, Jr. | A47B 81/007 312/138.1 |

(Continued)

FOREIGN PATENT DOCUMENTS

| | | |
|---|---|---|
| DE | 10136907 A1 | 2/2003 |
| DE | 102014106228 A1 | 11/2015 |

(Continued)

*Primary Examiner* — Daniel J Troy
*Assistant Examiner* — Timothy M Ayres
(74) *Attorney, Agent, or Firm* — Dickinson Wright PLLC

(57) ABSTRACT

The invention relates to a lockout box for locking in objects, in particular keys, comprising a container having a reception space for the objects that is open to the front; and a front-side flap that is pivotably attached to the container and that is adjustable between a closed position and an open position, with the reception space being closed in the closed position and open in the open position, wherein the container has a plurality of securing openings for attaching locking elements, in particular padlocks, in order to fix the front-side flap to the container in the closed position; and wherein the front-side flap has a front plate that is at least regionally transparent, wherein, in the open position, an information carrier in particular formed as a sheet of paper, in particular a permit to work, can be inserted behind the front plate into the front-side flap or can be attached behind the front plate to the front-side flap, and wherein a removal of the information carrier is prevented in the closed position.

17 Claims, 9 Drawing Sheets

(56) References Cited

U.S. PATENT DOCUMENTS

| | | | | | |
|---|---|---|---|---|---|
| 4,457,442 | A * | 7/1984 | Laudt | H02B 1/306 248/67.7 |
| 7,360,380 | B2 * | 4/2008 | Van Handel | A47G 29/10 211/9 |
| 8,910,498 | B2 * | 12/2014 | Saucier | A47G 29/10 70/164 |
| 9,016,095 | B2 * | 4/2015 | Dudgeon | E05G 1/08 70/164 |
| 10,207,847 | B2 * | 2/2019 | Hollis | B65D 55/14 |
| 10,633,156 | B2 * | 4/2020 | Enger | B65D 25/2858 |
| 11,459,152 | B2 * | 10/2022 | Riepe | E05B 67/383 |
| 2005/0199628 | A1 * | 9/2005 | Van Handel | A47G 29/10 220/315 |
| 2006/0006773 | A1 * | 1/2006 | Guebre-Tsadik | E05C 9/048 312/326 |
| 2013/0099641 | A1 | 4/2013 | Saucier et al. | |
| 2014/0130722 | A1 | 5/2014 | Dudgeon et al. | |
| 2017/0113856 | A1 | 4/2017 | Hollis et al. | |

FOREIGN PATENT DOCUMENTS

| | | | |
|---|---|---|---|
| FR | 2786015 | A1 | 5/2000 |
| WO | 8302516 | A1 | 7/1983 |

* cited by examiner

LOCKOUT BOX

CROSS-REFERENCE TO RELATED APPLICATION

This application claims the benefit and priority of German Application No. DE 102019123959.1, filed Sep. 6, 2019. The entire disclosure of the above application is incorporated herein by reference.

FIELD

The invention relates to a lockout box for locking in objects, in particular keys, comprising a container having an open reception space for the objects; and a flap that is pivotably attached to the container and that is adjustable between a closed position and an open position, with the reception space being closed in the closed position and open in the open position, wherein the container has a plurality of securing openings for attaching locking elements, in particular padlocks, in order to fix the flap to the container in the closed position.

BACKGROUND

A lockout box is mainly used for a so-called group lockout. For work such as maintenance, repair or cleaning, electrical systems are taken out of operation, for example by separating the system or parts of the system from the associated power supply, and are secured against being put back into operation in order to prevent endangering the company's own employees or employees of external companies who carry out the work for the duration of the work. For this purpose, the individual energy sources are each locked by a machine lock, in particular a padlock, in a group lockout. The keys of the machine locks are then locked in into the lockout box. Each employee hangs his personalized lock, in particular a padlock, at the outside into securing openings provided for this purpose and locks it so that the lockout box can no longer be opened. The personalized locks lock differently, i.e. each employee has his own lock with his own key. This key does not fit into any other lock of his colleagues and vice versa. Depending on the planning, the machine locks can be selected as locking differently or locking in the same manner. Each employee thus does not have to hang a respective lock at each locked out energy source, but rather only one at the lockout box, without the intention of a lockout and/or the safety achieved thereby being impaired. The energy sources can only be actuated again when all the employees have removed their locks from the lockout box after completing their work since the lockout box can only then be opened again and the keys stored therein can be removed for unlocking the locks at the energy sources. A lockout box of the initially named kind is, for example, known from the document DE 2014 106 228 A1.

In this respect, all the information relevant to the work, such as the type of activities to be carried out, the hazards and the safety precautions to be taken, can be documented in a permit to work that must be signed by the supervising person when the work is completed so that safety measures taken can be cancelled again. However, there is generally the risk with a permit to work that it will be misplaced or even lost.

SUMMARY

It is therefore the underlying object of the present invention to provide a possibility to keep a permit to work available at all times for the persons involved in the associated group lockout.

This object is satisfied by a lockout box having the features of claim 1, and in particular by a lockout box for locking in objects, in particular keys, comprising a container having a reception space for the objects that is open to the front; and a front-side flap that is pivotably attached to the container, in particular by means of a pivot joint, in particular by means of at least one hinge, and that is adjustable between a closed position and an open position, with the reception space being closed in the closed position and open in the open position, wherein the container has a plurality of securing openings for attaching locking elements, in particular padlocks, in order to fix the front-side flap to the container in the closed position; and wherein the front-side flap has a front plate that is at least regionally transparent, in particular a font panel, wherein, in the open position, an information carrier, in particular an areal information carrier, in particular formed as a sheet of paper, in particular a permit to work, can be inserted behind the front plate into the front-side flap or can be attached behind the front plate to the front-side flap, and wherein a removal of the information carrier is prevented in the closed position.

In accordance with the invention, the lockout box thus not only holds the keys for the machine locks, but also the information carrier, in particular the respective associated permit to work. This has the advantage that the permit to work cannot be misplaced or lost. Rather, a predefined location is present at which the permit to work is located at all times. All the persons involved in a group lockout therefore always know where they can find and view the permit to work. Furthermore, the permit to work is locked in the lockout box using the keys of the machine locks until the work is completed. There is therefore no risk that safety measures are already cancelled again by an incorrect release of the permit to work even though not all the work has been completed. The safety is hereby improved. Due to the placement in the front-side flap behind a front plate that is at least regionally transparent, the permit to work is clearly visible in the closed position and is simultaneously protected against access.

The information carrier in particular formed as a sheet of paper, in particular the permit to work, can be inserted behind the front plate into the front-side flap or can be attached behind the front plate to the front-side flap. Preferred embodiments of the invention described below mainly relate to the insertion of the information carrier in particular formed as a sheet of paper, in particular of the permit to work, into the front-side flap. However, it is generally sufficient if the information carrier in particular formed as a sheet of paper, in particular the permit to work, is attached, in particular held, at the rear side of the front plate in any way, e.g. by means of at least one spring clip or the like.

The invention also comprises a plurality of information carriers, in particular a plurality of sheets of paper, being insertable behind the front plate into the front-side flap or being attachable behind the front plate to the front-side flap.

The front plate, in particular a front panel, is preferably configured as an acrylic glass plate. Acrylic glass is break-proof and is resistant to aging and UV radiation at the same time. Furthermore, acrylic glass is comparatively inexpensive, in particular since it is available as sheet goods and is simple to process.

The front-side flap can be configured as a downwardly opening flap, i.e. the aforementioned pivot joint is located at the bottom. A particularly ergonomic operation of the lockout box is hereby achieved. However, the flap can also be attached at the right hand or left hand. Furthermore, an upwardly opening flap is generally also conceivable.

The front-side flap is preferably configured as a pocket that is closed at three sides and that is in particular upwardly open, as is in particular advantageous in the case of a downwardly opening flap. The permit to work can therefore be inserted into the front-side flap in a simple manner and can be securely held therein. The closed pocket in particular has a front wall and a rear wall, wherein the front plate can form the front wall or a part thereof. As mentioned above, the front-side flap can have a rear wall, wherein it is preferred for the information carrier to be insertable between the front plate and the rear wall in the open position of the information carriers. The rear wall and/or the container is/are preferably formed from sheet metal. The rear wall and/or the container is/are preferably formed from a hard material, in particular sheet metal.

In accordance with a preferred embodiment of the invention, the rear wall has, on its front side at two mutually oppositely disposed sides, in particular lateral sides, lateral receiving grooves extending in a direction of insertion of the information carrier and optionally has, at its end disposed in the direction of insertion of the information carrier, a receiving groove extending transversely to the direction of insertion of the information carrier, in which receiving grooves the front plate is received, in particular likewise by insertion. On the assembly of the front-side flap, the front plate can therefore be inserted at both sides into a respective one of the two receiving grooves of the rear wall. A front-side flap of simple design that can be easily assembled hereby results that can be manufactured inexpensively.

The respective receiving groove can in this respect be formed by a strip projecting from the rear wall, wherein the respective strip is inwardly angled at its free end. The two strips can in particular each be L-shaped.

It is preferred if the respective receiving groove is formed by a bending of a respective margin of the rear wall and in particular forms a respective bead margin of the rear wall. In particular if the rear wall is produced from sheet metal, the receiving grooves can each form a bead margin, in particular an L-shaped bead margin, of the rear wall. The receiving grooves can therefore be produced in a simple manner in that a rear wall that is correspondingly cut to shape is reshaped at the corresponding margins by a corresponding bending.

Provision can furthermore be made that the front plate has a respective thickened portion, in particular a step-shaped thickened portion, at its rear side in the region of two mutually oppositely disposed edges, in particular lateral edges, with which the front plate is received in the two receiving grooves of the rear wall. In other words, the front plate has a smaller thickness in the region between its two thickened marginal regions, with which it is received in the receiving grooves of the rear wall, than in the two marginal regions. Sufficient space for the information carrier to be inserted is provided by the smaller thickness between the two marginal regions.

The rear wall preferably has at least one cutout, in particular a rectangular cutout, in particular a punched-out portion. The rear wall is therefore not formed over the full surface, but rather has less material compared to a full-surface design. The weight of the front plate and thus of the lockout box can hereby be reduced.

The rear wall can in particular have a plurality of cutouts formed above one another and/or next to one another, with the rear wall having a respective web between two cutouts formed above one another and/or next to one another. Due to the webs, the stiffness of the rear wall can be largely maintained despite the cutouts. Furthermore, webs extending in the direction of insertion of the information carrier can effectively prevent the information carrier from being caught at transversely extending edges of the cutouts during the insertion. An easier insertion of the information carrier is hereby made possible.

A rear wall produced from sheet metal has, at its front side, a spring-elastic elevated portion that is produced by a sheet metal shaping process and that presses against the rear side of the front plate. On the one hand, the front plate and furthermore also the inserted information carrier in particular formed as a sheet of paper, in particular the permit to work, can hereby be held in the front-side flap in a particularly simple manner.

In accordance with a preferred embodiment, in the closed position, the front-side flap is arranged offset to the rear in the container such that wall sections of the container have a collar, in particular a peripheral collar, which projects to the front and in which the securing openings are formed. The locking elements can then be attached in the closed position and then stand in the way of an opening of the front-side flap. The front-side flap can then be free of securing openings, i.e. no corresponding securing openings have to be provided in the front-side flap.

The wall sections can have, at an inner side, at least one abutment, in particular in the form of an angular piece, for the front-side flap in the closed position. The closed position of the front-side flap can hereby be defined in a simple manner.

Furthermore, at least one hook rail can be attached to the rear side wall of the container in the reception space. The respective hook rail can be designed such that it is selectively removable. The keys of the machine locks can then be hung onto the hooks of the hook rail, i.e. the keys do not have to be placed onto the base of the container. This serves the purpose of clarity.

A plurality of hook rails can in particular be attached above one another to the rear side wall of the container in the reception space, with a respective two hook rails attached above one another being arranged laterally offset with respect to one another. This is in particular of advantage if the lockout box is also used as a storage location for the machine locks and/or for the padlocks before and after they are used. Due to the offset arrangement of the hook rails, the number of machine locks and/or padlocks that can be simultaneously stored in the lockout box can be increased.

A closure, in particular a magnetic closure, is preferably provided that holds the front-side flap in the closed position even when locking elements are not attached. For this purpose, the magnetic closure can have a closure part that is attached to the inner side of the front-side flap and at least one magnet that is disposed opposite the closure part in the closed position, that is attached to the inner side of a side wall of the container and that in particular acts as an abutment for the front-side flap. However, the arrangement of the closure part and the at least one magnet can also be reversed, i.e. the closure part can also be attached to the inner side of a side wall of the container and the at least one magnet can be attached to the inner side of the front-side flap. The front-side flap can, for example, be opened against the effect of the magnetic force of the magnetic lock by means of a handle attached to the front-side flap.

DRAWINGS

Advantageous embodiments of the invention are also described in the dependent claims, in the description of the Figures, and in the drawing.

The invention will be described by way of example in the following with reference to an advantageous embodiment and to the drawing. There are shown:

DETAILED DESCRIPTION

Figure 1:
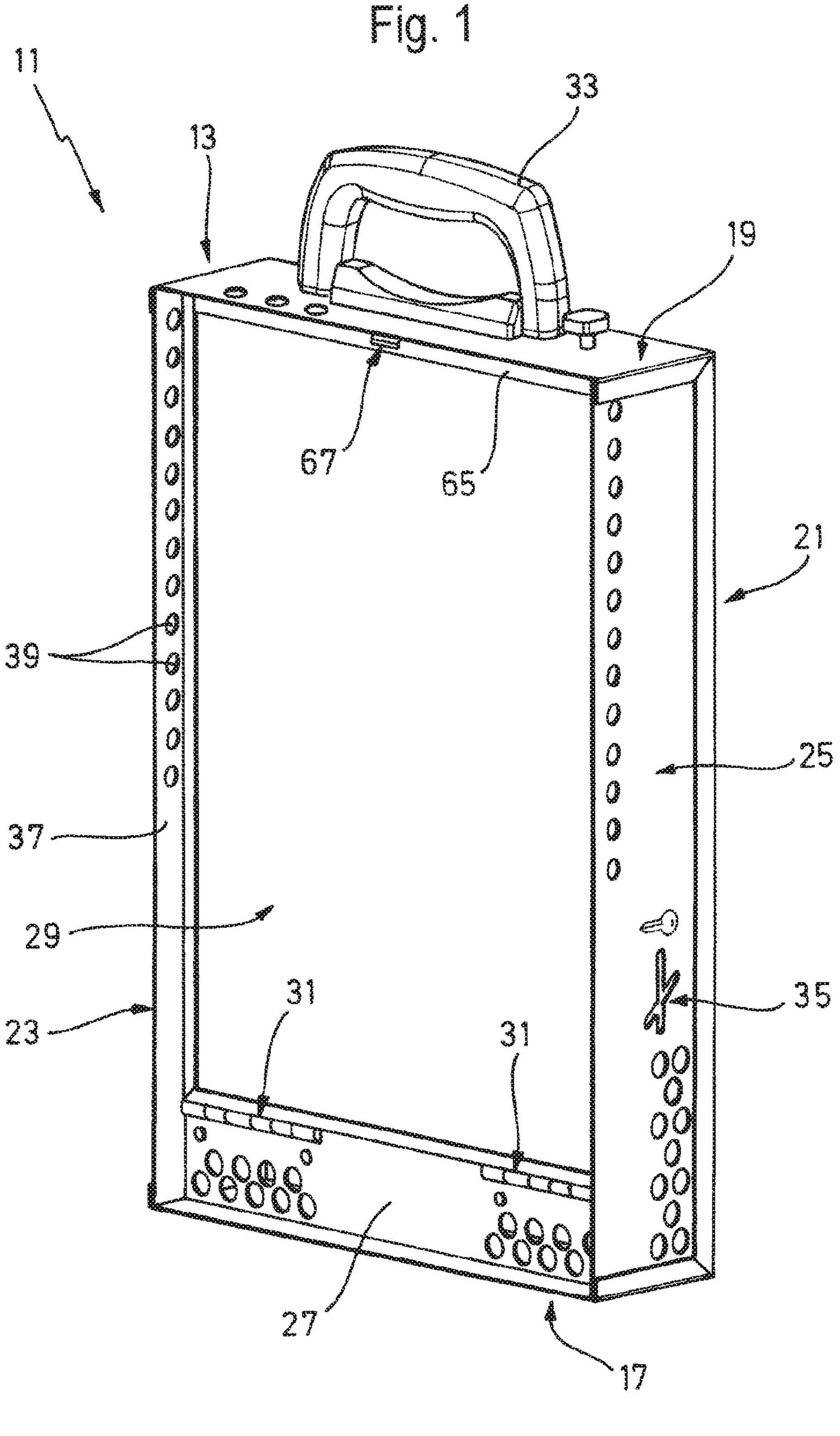
FIG. 1 illustrates a lockout box in accordance with the invention in a perspective view with a front-side flap in a closed position.

The lockout box 11 shown in FIG. 1 has a parallelepiped-shaped container 13 composed of sheet metal having a reception space 15 open to the front. The container 13 is in this respect formed by a side wall configured as a container base 17, by a side wall configured as an upper side 19 of the container, by a rear side wall 21, by a left side wall 23, by a right side wall 25, and by a front side wall section 27 arranged at the base side. The container base 17, the upper side 19 of the container, the side walls 21, 23, 25, and the front side wall section 27 define or surround the reception space 15. Furthermore, in the case of the lockout box 11, a downwardly opening front-side flap 29 is pivotably attached via a joint, namely a hinge 31, to the front side wall section 27 of the container 13.

Figure 2:
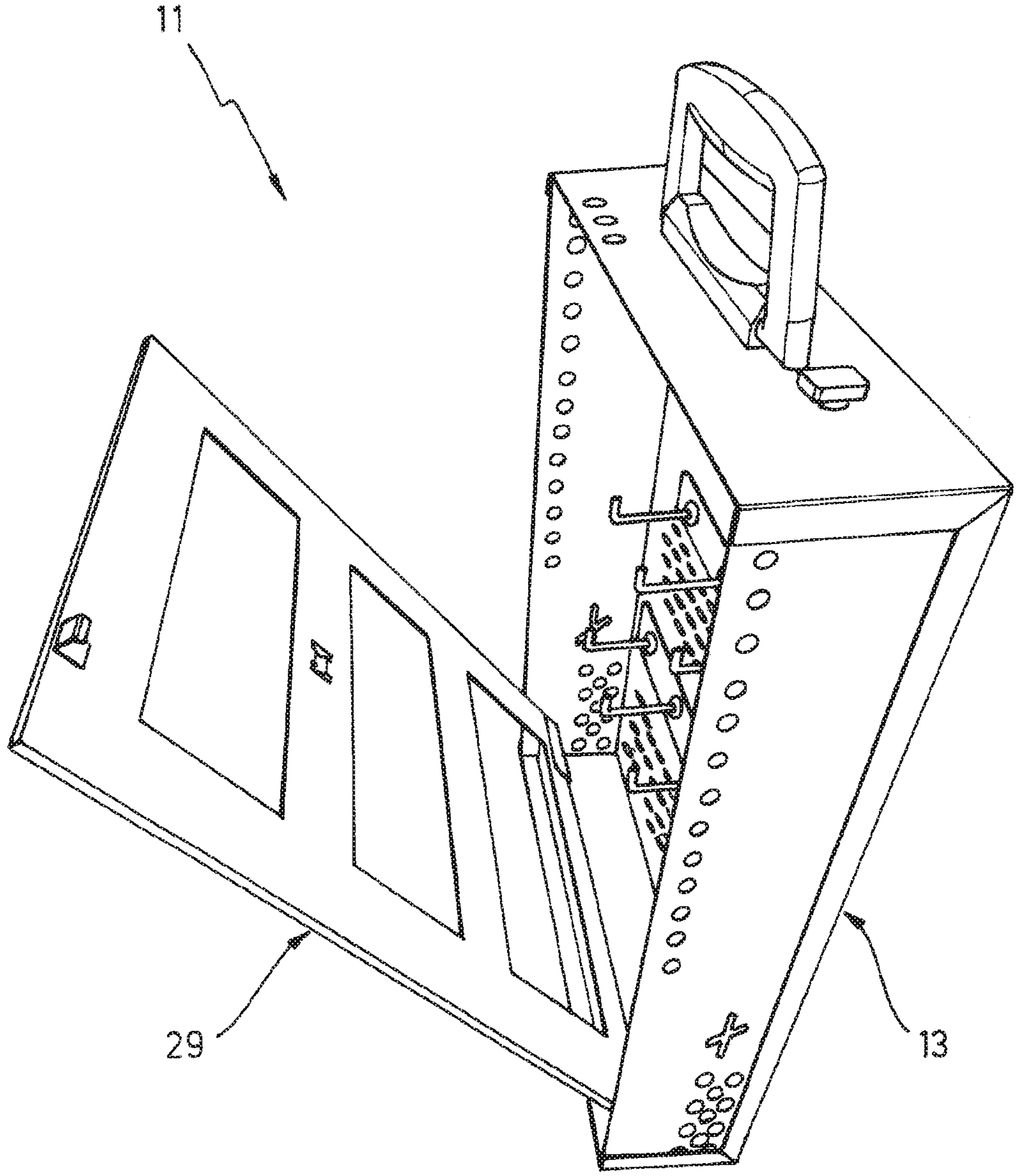
FIG. 2 shows the lockout box in accordance with FIG. 1, with the front-side flap adopting an open position.

Furthermore, a fixedly attached carry handle 33 is arranged at the outer side of the upper side 19 of the container to be able to comfortably transport the lockout box 11. As FIGS. 1 and 2 show, the front-side flap 29 is adjustable from a closed position (cf. FIG. 1) in which the reception space 15 is closed into an open position (cf. FIG. 2) in which the reception space 15 is open.

The lockout box 11 is a group lockout box. The lockout box 11 is used in a so-called group lockout in which a plurality of employees participating in a servicing, repair or cleaning of a machine or of a system or of another device have to secure and/or lock out one or more energy sources. In this respect, the individual energy sources are each locked by only one machine lock. The keys of these locks are then locked in into the lockout box 11. The lockout box 11 in particular has two intersecting insertion slots 35 at the right side wall 25 to throw keys into a lockout box 11 that is already closed or is still closed.

The front side wall section 27 is arranged offset to the rear with respect to the container base 17, to the upper side 19 of the container and to the side walls 23, 25 so that the front-side flap 29 pivotably fastened thereto is likewise arranged offset to the rear in the container 13. Sections of the container base 17, of the upper side 19 of the container and of the side walls 23, 25 that face to the front form a peripheral collar 37 which projects to the front beyond the front-side flap 29 in the closed position of the front-side flap 29 and in which a plurality of securing openings 39 are formed into which locking elements, in particular padlocks, can be hung. The side walls 23, 25 each have an angular piece 47 at the inner side that in each case serves as an abutment for the front-side flap 29 in the closed position, wherein only one of the two angular pieces 47 can be recognized in FIG. 2.

In a group lockout, each of the involved employees hangs his personalized padlock into one of the securing openings 39 with a closed front-side flap 27 and thus locks the front-side flap 29 to the container 13 in the closed position. The front-side flap 29 can then no longer be opened. The front-side flap 29 can remain free of securing openings. Each employee thus does not have to hang a lock at each locked out energy source, but rather only one at the lockout box 11, without the intention of the lockout and the security achieved by the lockout being impaired.

The energy sources can only be actuated again when all the employees have removed their personalized padlocks from the lockout box 11 again after completing their work and have thus released the front-side flap 29 again. The front-side flap 29 can then be brought into the open position again in order to remove the keys of the machine locks attached to the energy sources.

In the case of the lockout box 11, 13 securing openings 39 are respectively provided at the left side wall 23 and at the right side wall 25. Furthermore, three securing openings 39 are provided at the upper side 19 of the container and can, for example, be reserved for supervising persons. The number of securing openings 39 at the two side walls 23, 25 and at the upper side 19 of the container is merely exemplary and can each also have any desired other value.

Figure 3:
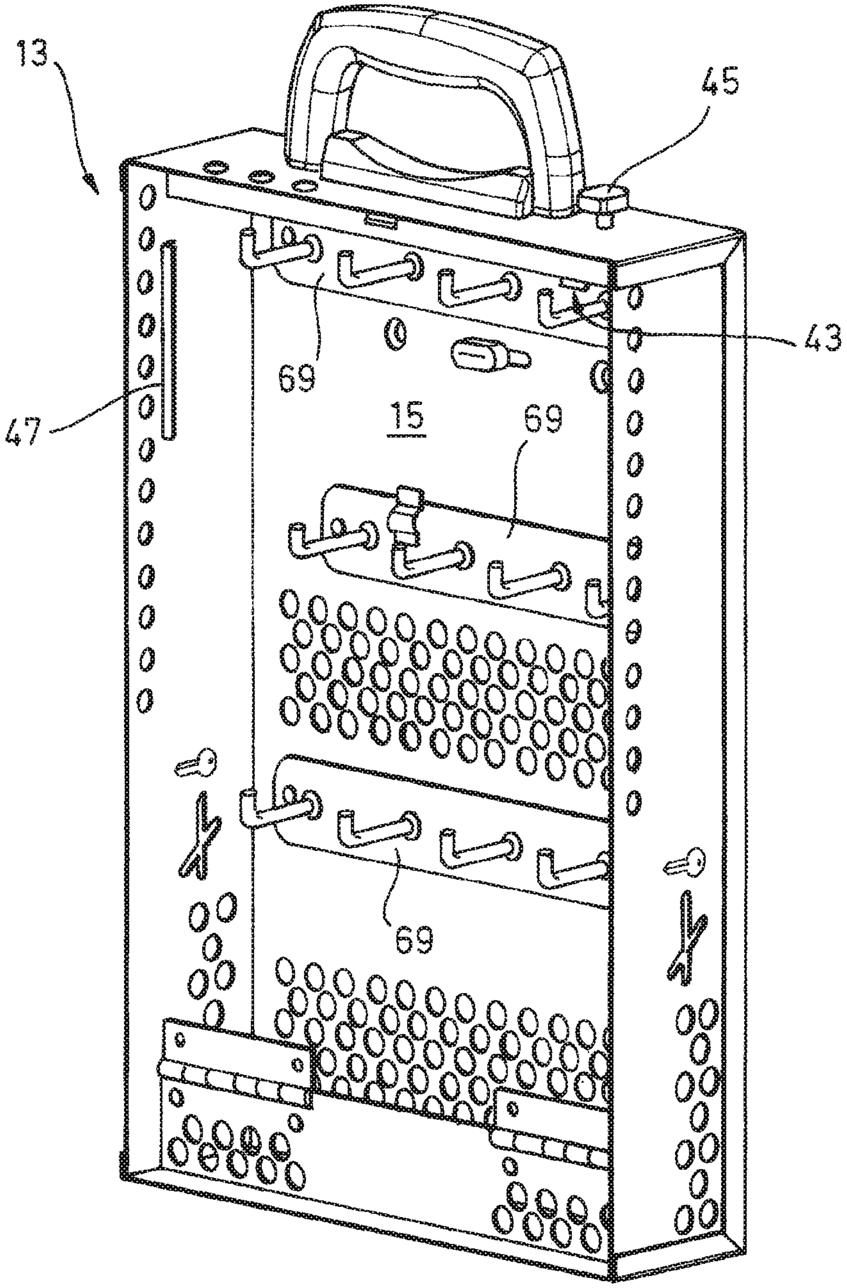
FIG. 3 shows the lockout box in accordance with FIG. 1, with the front-side flap being omitted.

To be able to hold the front-side flap 29 in the closed position when padlocks are not hung in, an additional closure is provided that has a first closure part 41 (cf. FIGS. 4-7) that is attached to the inner side of the front-side flap 29 or to the inner side of the rear wall 51 and that, in the closed position of the front-side flap 29, forms a snap-in connection for closing the front-side flap 29 at the container 13 with a second closure part 43 (cf. FIG. 3) that is attached to the inner side of the left side wall 19. The two closure parts 41, 43 are in this respect configured in the form of two snap hooks cooperating with one another. A push button 45 is arranged at the outer side of the upper side 19 of the container and is supported via a bolt or the like at the snap hook forming the second closure part 43. If the push button 45 is pressed, the snap hook 43 is pressed inwardly away from the upper side 19 of the container, whereby the snap-in connection is released by the snap hook forming the first closure part 41 such that the front-side flap 29 can be opened. Since the snap hook 43 is resilient, the snap hook 43 moves back into its starting position after the push button 45 has been released.

Figure 10:
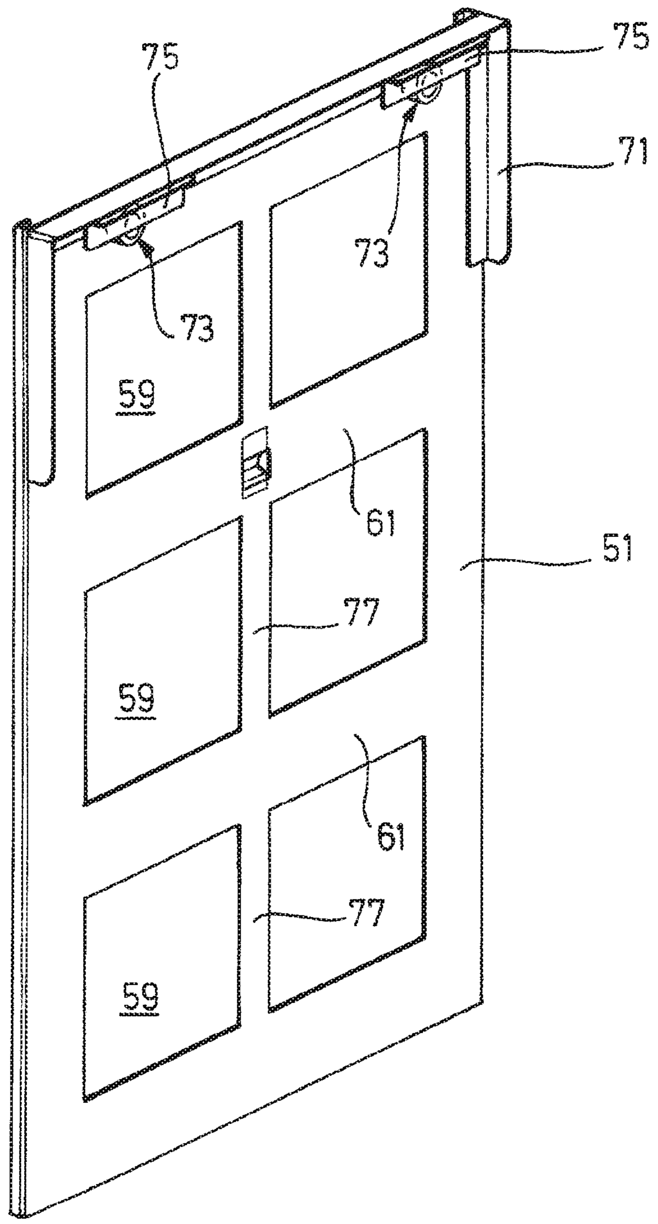
FIG. 10 shows a rear wall with a closure in a rear view in accordance with an alternative embodiment of the invention.

Alternatively, the closure can be configured as a magnetic closure as shown in FIG. 10. The closure then has a closure part 71 in the form of a present C-shaped sheet metal closure plate that is attached to the inner side of the front-side flap 29 or to the inner side of the rear wall 51 and that, in the closed position of the front-side flap 29, forms a magnetic connection for closing the front-side flap 29 at the container 13 with two magnets 73 that are each attached via an angular piece 75 to the inner side of the upper side 19 of the container. In this respect, the two magnets 73 simultaneously act as an abutment for the front-side flap 29.

Furthermore, the front-side flap 29 is configured as a receiver for an information carrier in particular formed as a sheet of paper, in particular a permit to work, in the form of a pocket that is closed at three sides and that is upwardly open, as explained in more detail in the following. A permit to work is an information carrier, in particular a sheet of paper, on which the activities to be carried out within the framework of the group lockout, the hazards arising in so doing, and the safety precautions correspondingly to be taken are in particular documented. This permit to work can be securely closed in the lockout box 11 by the keys of the machine locks, whereby the initially mentioned advantages result.

Figure 4:
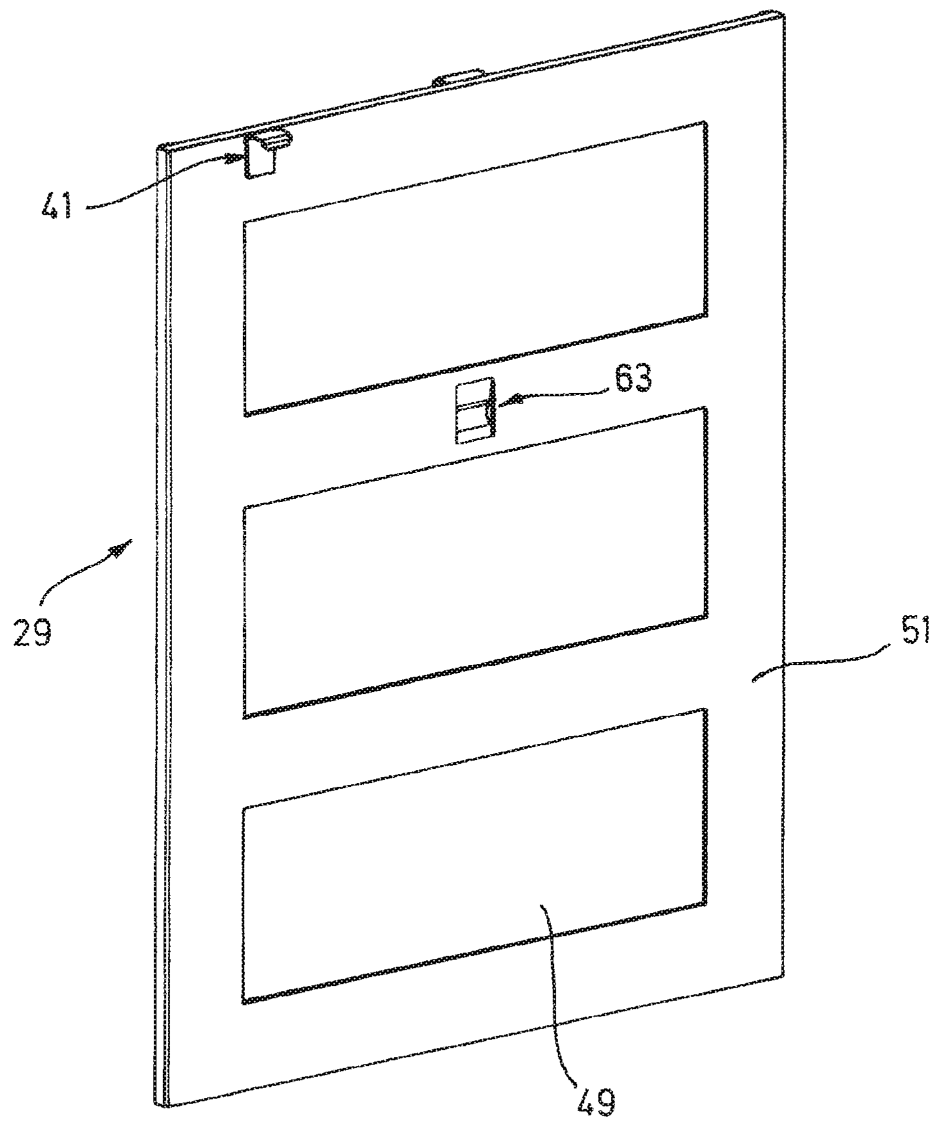
FIG. 4 shows the front-side flap from FIG. 1 in a rear view with a transparent front plate and a rear wall.
Figure 5:
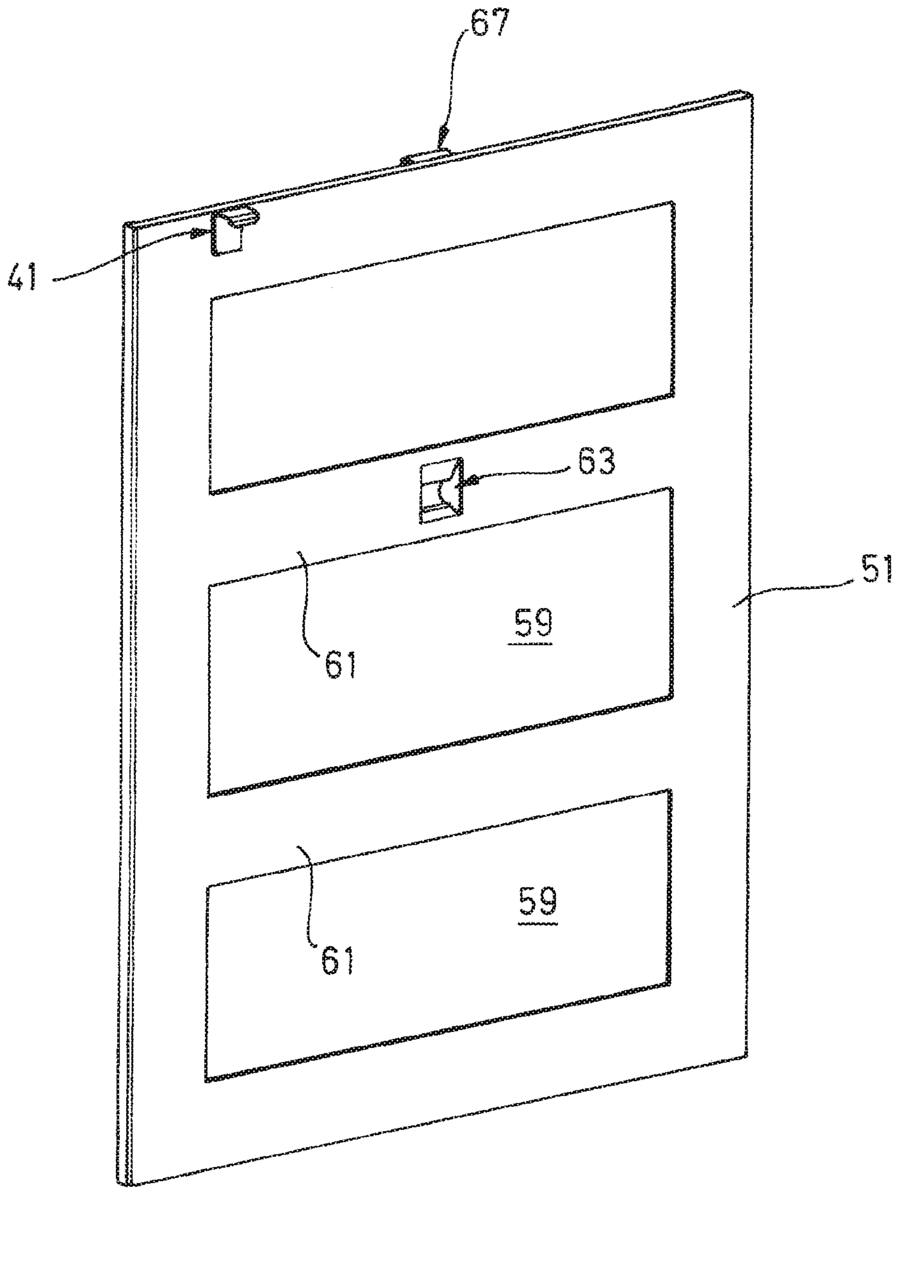
FIG. 5 illustrates the front-side flap in the representation in accordance with FIG. 4, with the transparent front plate being omitted.
Figure 6:
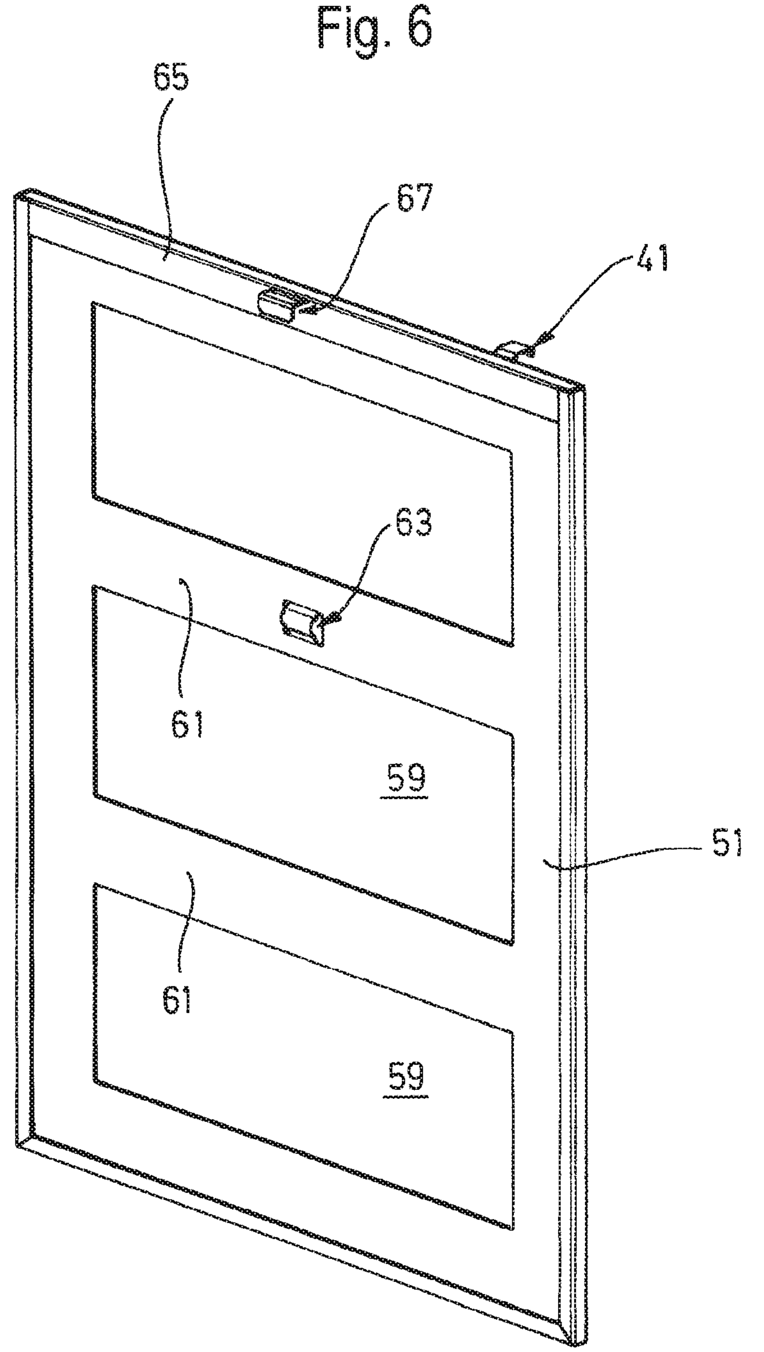
FIG. 6 illustrates the front-side flap in accordance with FIG. 4 in a front view, with the transparent front plate being omitted.
Figure 7:
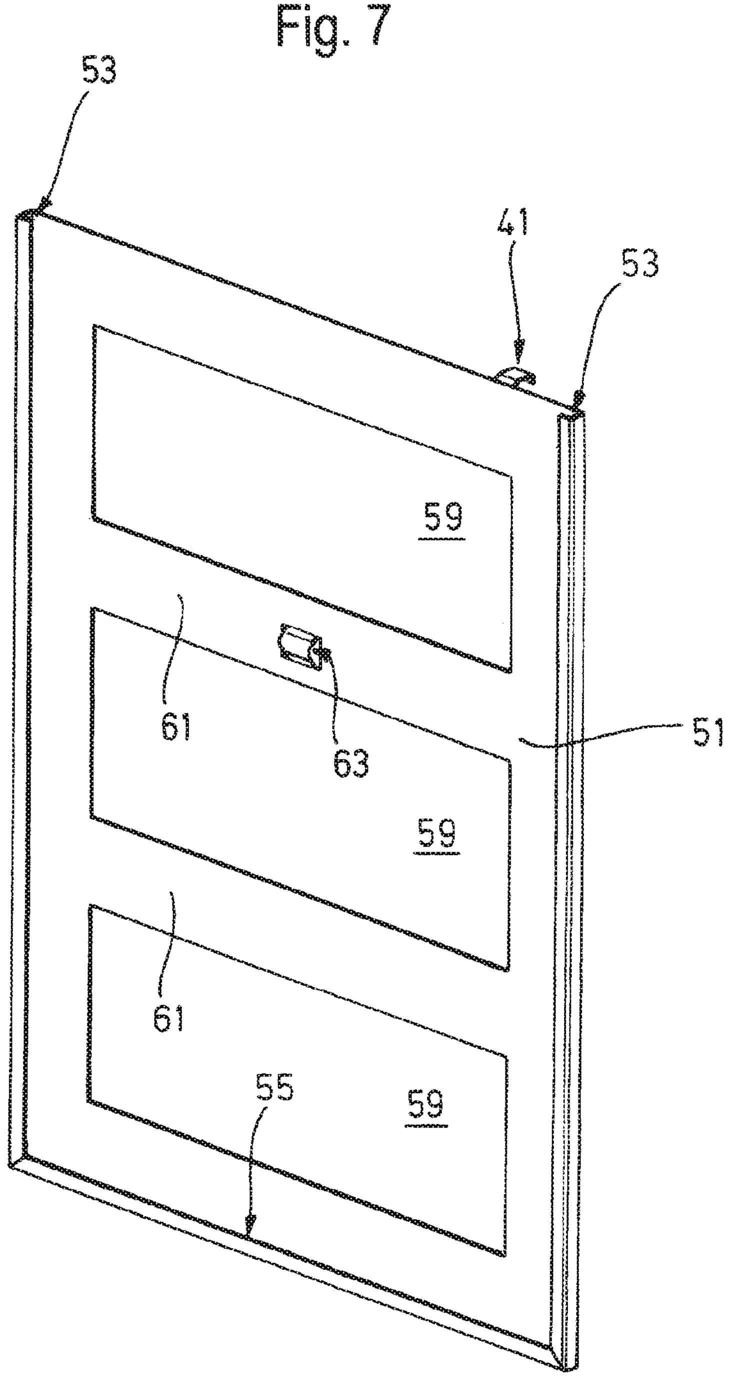
FIG. 7 shows the front-side flap in the representation in accordance with FIG. 6, with an upper-side web additionally being omitted.

For this purpose, the front-side flap 29 has a transparent front plate 49 produced from acrylic glass, in particular a front panel, and a rear wall 51 produced from sheet metal, between which the permit to work can be inserted from above, i.e. from the end disposed opposite the hinge 31, in the open position of the front-side flap 29. The permit to work is therefore inserted behind the transparent front plate 49 and is easily readable through the transparent front plate 49. In FIGS. 1 and 4, the front plate 49 is not shown as transparent for the purpose of a better representability. The permit to work cannot be removed in the closed position of the front-side flap 29.

The rear wall 51 has, on its front side at two mutually oppositely disposed sides, a respective receiving groove 53 into which corresponding longitudinal edges of the transparent front plate 49 engages and into which the transparent front plate 49 had previously been inserted. The two receiving grooves 53 are produced by a bending of the margins of the rear wall 51 correspondingly cut to shape and in this respect each form a strip that is angled in an L shape and that projects from the rear wall 51 in the direction of the transparent front plate 49. The same applies to a transversely extending receiving groove 55 which is formed at the lower end of the rear wall 51 and in which the transparent front plate 49 is likewise received. Compared to FIG. 8, an upper-side web 65 is omitted in FIG. 7 to which a handle 67 for the front-side flap 29 is attached to actuate the front-side flap 29 so that the two receiving grooves 53 are better recognizable.

Figure 9:
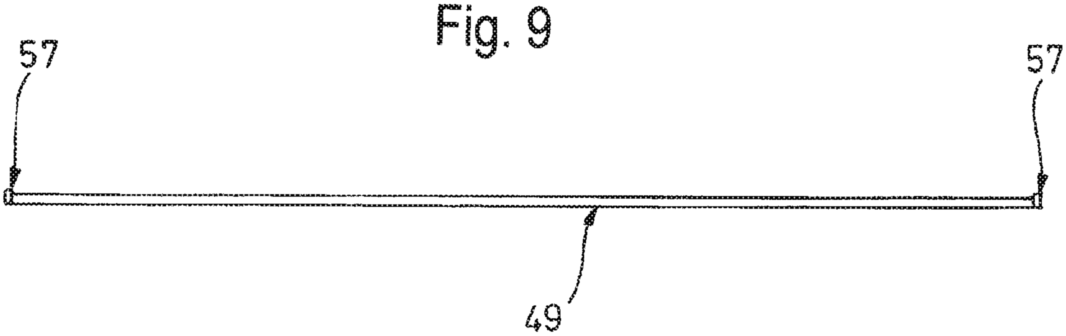
FIG. 9 is a plan view of the aforesaid transparent front plate.

As can be seen from FIG. 9, the transparent front plate 49 has a respective step-shaped thickened portion 57 at its rear side in the region of its two mutually oppositely disposed longitudinal edges with which the transparent front plate 49 engages into the two receiving grooves 53 of the rear wall 51. The spacing between the transparent front plate 49 and the rear wall 51 can thus be increased in the region in which the permit to work is received, whereby the insertion of the permit to work is facilitated.

The rear wall 51 is not formed over the full surface, but is rather provided with three rectangular cutouts 59, in particular punched-out portions, that are arranged above one another and that each extend horizontally, whereby the weight of the rear wall 51 can be reduced. A respective horizontal web 61 extends between the cutouts 59 to provide a sufficient stiffness of the rear wall 51. Furthermore, a vertically extending web 77 can be provided for each of the cutouts 59 and, for example, divides the respective cutout 59 in the middle, as shown in FIG. 10. Such vertical bars 77 are advantageous since it can thus be prevented that the permit to work gets caught at the horizontally extending lower edges of the cutouts 59 during the insertion.

Figure 8:
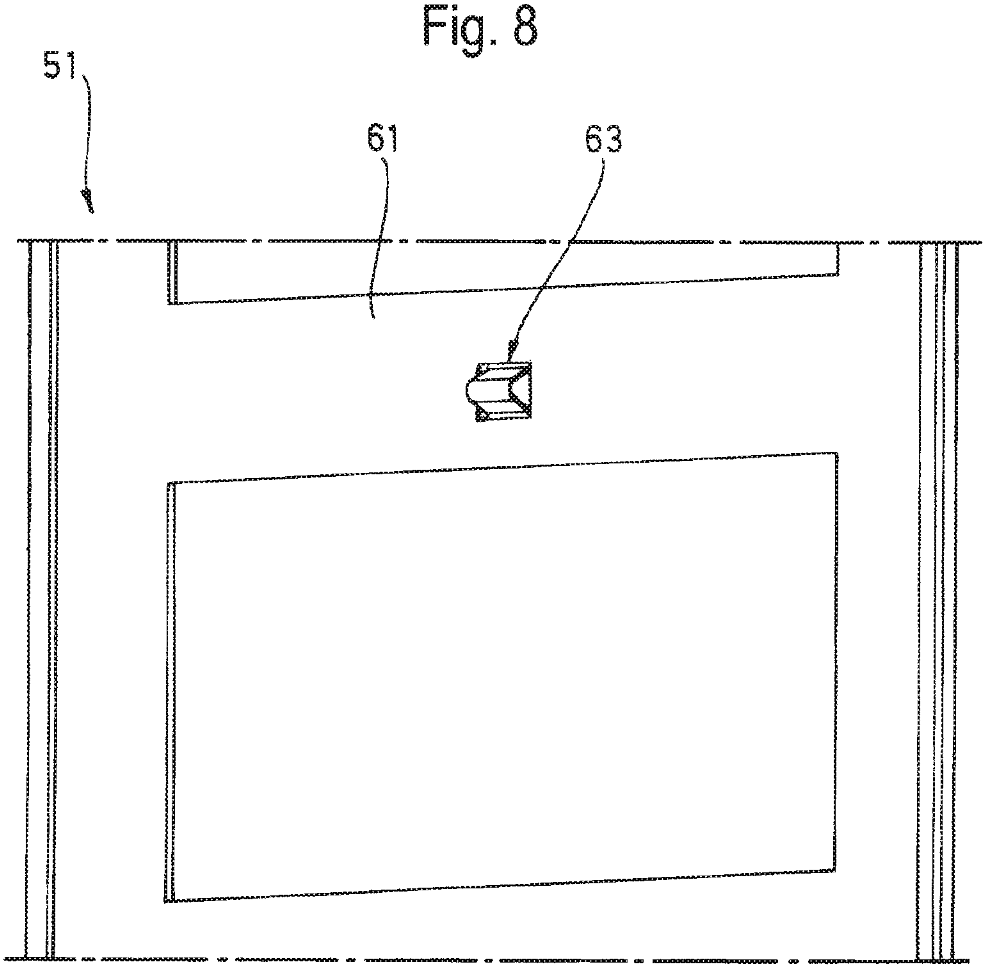
FIG. 8 shows the above-mentioned rear wall in a front view in the region of an elevated portion formed in the rear wall and projecting to the front.

As can in particular be seen from FIG. 8, a spring-elastic elevated portion 63 that was produced by a corresponding sheet metal shaping process is formed at the front side in one of the horizontal webs 61 of the rear wall 51. The spring-elastic elevated portion 63 presses against the rear side of the transparent front plate 49 so that both the transparent front plate 49 and the inserted permit to work are securely held.

Finally, a plurality of hook rails 69 are attached above one another to the rear side wall 21 of the container 13 in the reception space 15, with the keys of the machine locks, on the one hand, and the machine locks themselves or the personalized padlocks, on the other hand, respectively being able to be hung onto said hook rails 69. The hook rails 69 are in this respect arranged laterally offset from one another so that as many machine locks and/or personalized padlocks as possible can be stored at the same time.

The invention claimed is:

1. A lockout box for locking in objects comprising:

a container having a reception space for the objects that is open to the front; and a front-side flap that is pivotably attached to the container and that is adjustable between a closed position and an open position, with the reception space being closed in the closed position and open in the open position, wherein the container has a plurality of securing openings for attaching locking elements in order to fix the front-side flap to the container in the closed position; and wherein the front-side flap has a front plate that is at least regionally transparent, wherein, in the open position, an information carrier can be inserted behind the front plate into the front-side flap, and wherein a removal of the information carrier is prevented in the closed position;

wherein the front-side flap has a rear wall and the information carrier can be inserted between the front plate and the rear wall in the open position;

wherein the rear wall has, on its front side at two mutually oppositely disposed sides, receiving grooves extending in a direction of insertion of the information carrier, wherein the front plate is received in the receiving grooves;

wherein each of the receiving grooves is formed by a bending of a respective margin of the rear wall;

wherein the rear wall has, at its end disposed in the direction of insertion of the information carrier, a transverse receiving groove extending transversely to the direction of insertion of the information carrier, wherein the front plate is received in the transverse receiving groove; wherein the width of each groove is sized to receive both the front plate and the information carrier.

2. The lockout box in accordance with claim 1, wherein the front-side flap is configured as a downwardly opening flap.

3. The lockout box in accordance with claim 1, wherein the front-side flap is configured as a pocket that is closed at three sides.

4. The lockout box in accordance with claim 1, wherein each of the receiving grooves is formed by a strip projecting from the rear wall, with each strip being angled inwardly at its free end.

5. The lockout box in accordance with claim 1, wherein the rear wall has at least one cutout.

6. The lockout box in accordance claim 5, wherein with the rear wall has a plurality of cutouts formed above one another and/or next to one another, with the rear wall having a respective web between two cutouts formed above one another and/or next to one another.

7. The lockout box in accordance with claim 1, wherein, in the closed position, the front-side flap is arranged offset to the rear in the container such that wall sections of the container have a collar which projects to the front, wherein the securing openings are formed in the collar.

8. The lockout box in accordance claim 1, wherein the front-side flap is free of securing openings.

9. The lockout box in accordance with claim 7, wherein the wall sections have, at an inner side, at least one abutment for the front-side flap in the closed position.

10. The lockout box in accordance with claim 1, wherein at least one hook rail is attached to the rear side wall of the container in the reception space.

11. The lockout box in accordance claim 10, wherein a plurality of hook rails is attached above one another to the rear side wall of the container in the reception space, with a respective two hook rails attached above one another being arranged laterally offset with respect to one another.

12. The lockout box in accordance with claim 1, wherein a closure is provided that holds the front-side flap in the closed position even when locking elements are not attached.

13. The lockout box in accordance claim 12, wherein the closure is a magnetic closure.

14. The lockout box in accordance with claim 13, wherein the magnetic closure has a closure part that is attached to the inner side of the front-side flap and at least one magnet that is disposed opposite the closure part in the closed position and that is attached to the inner side of a side wall of the container, or vice versa.

15. A lockout box for locking in objects comprising:

a container having a reception space for the objects that is open to the front; and a front-side flap that is pivotably attached to the container and that is adjustable between a closed position and an open position, with the reception space being closed in the closed position and open in the open position, wherein the container has a plurality of securing openings for attaching locking elements in order to fix the front-side flap to the container in the closed position; and wherein the front-side flap has a front plate that is at least regionally transparent wherein, in the open position, an information carrier can be inserted behind the front plate into the front-side flap, and wherein a removal of the information carrier is prevented in the closed position;

wherein the front-side flap has a rear wall and the information carrier can be inserted between the front plate and the rear wall in the open position;

wherein the rear wall has, on its front side at two mutually oppositely disposed sides, receiving grooves extending in a direction of insertion of the information carrier, wherein the front plate is received in the receiving grooves;

wherein the front plate has a respective thickened portion at its rear side in the region of two mutually oppositely disposed edges with which the front plate is received in the receiving grooves.

16. The lockout box of claim 15, wherein the rear wall has, at its end disposed in the direction of insertion of the information carrier, a transverse receiving groove extending transversely to the direction of insertion of the information carrier, wherein the front plate is received in the transverse receiving groove.

17. A lockout box for locking in objects comprising:

a container having a reception space for the objects that is open to the front; and a front-side flap that is pivotably attached to the container and that is adjustable between a closed position and an open position, with the reception space being closed in the closed position and open in the open position, wherein the container has a plurality of securing openings for attaching locking elements in order to fix the front-side flap to the container in the closed position; and wherein the front-side flap has a front plate that is at least regionally transparent, wherein, in the open position, an information carrier can be inserted behind the front plate into the front-side flap and wherein a removal of the information carrier is prevented in the closed position;

wherein the front-side flap has a rear wall and the information carrier can be inserted between the front plate and the rear wall in the open position;

wherein the rear wall produced from sheet metal has, at its front side, a spring-elastic elevated portion that is produced by a sheet metal shaping process and that presses against the rear side of the front plate.

* * * * *